Sept. 20, 1966   A. W. H. JAMIESON   3,273,506
MOTOR-DRIVEN PUMP UNITS
Filed Aug. 17, 1964
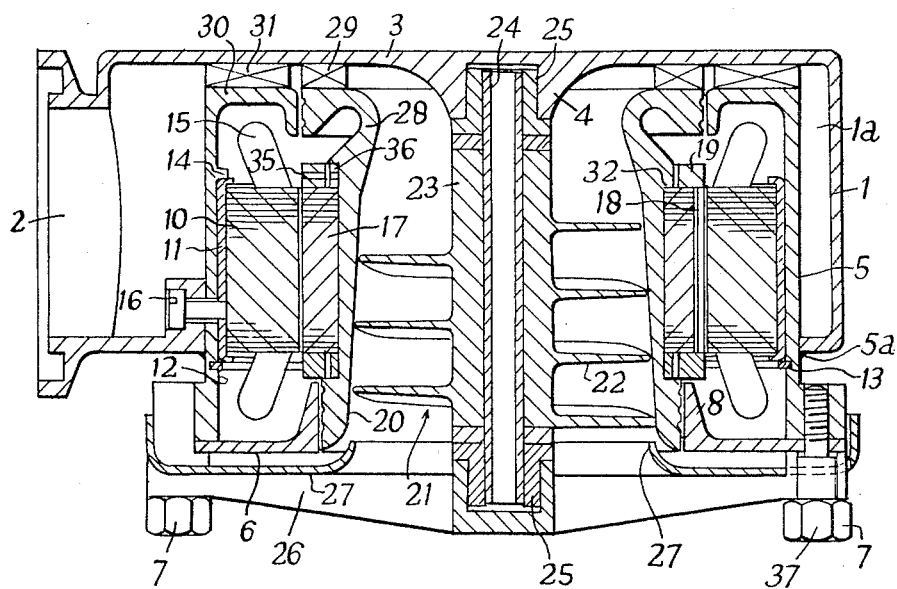

3,273,506
MOTOR-DRIVEN PUMP UNITS
Archie William Holmes Jamieson, Slough, England, assignor to Plessey-U.K. Limited, Ilford, England, a British company
Filed Aug. 17, 1964, Ser. No. 390,777
Claims priority, application Great Britain, Aug. 30, 1963, 34,352/63
2 Claims. (Cl. 103—87)

This invention relates to motor-driven pump units of the kind comprising an electric motor and an axial-flow pump, and it has for an object to provide an improved motor-driven pump unit of this kind, having a short axial length.

According to the present invention the rotor of the axial flow pump is arranged in an axial passage formed concentrically in the rotor of the electric motor, so that the resulting unit contains a motor of relatively great diameter and short axial length, thus adding a further saving in axial length beyond that achieved by the fact that no axial length additional to that of the electric rotor is required for accommodating the pump rotor.

The invention is particularly though not exclusively intended for use with an axial-flow pump unit of the kind frequently referred-to as vapour separator, which comprises a helical blade so constructed that an angular impact occurs at the leading edge of the blade, and in which the return flow of liquid along the trailing edge of and the low pressure zone thereby created at the trailing side of the helical blade are utilized to cause any air or vapour becoming separated in the pump, to be discharged together with a certain proportion of the aspired liquid, in a zone surrounding the pump intake.

The accompanying drawing is a somewhat diagrammatic axial section of a fuel pump having a vapour-separator stage constructed in accordance with the present invention. This combined two-stage motor-driven pump unit constitutes a more specific aspect of the invention.

Referring now to the drawing, the motor-driven pump unit shown comprises a main housing 1, which has a lateral delivery outlet 2 and is closed at one end by an end wall 3. This end wall is provided with a boss 4, in which one end of a combined pump-and-motor shaft 24 is rotatably supported. Arranged in the main housing coaxially with the boss 4 is a stator housing 5, which is brazed at 5a to the main housing 1 and which is closed at the end opposite to the end member 3 of the main housing by a detachable end ring 6. This end ring has its central aperture surrounded by a collar 8 which projects into the stator housing 5 and is held in position by screws 7. A stator body, formed of laminations 10 axially held together in a sleeve 11, fits into a bore 12 of the stator housing, where it is held, for example by a split retaining ring 13, against an internal shoulder 14 provided in the bore 12. A set screw 16 is provided in the pump housing 1, with its head accessible through the delivery passage 2, and engages the stator body 10 to prevent it from rotation under torsional stress. The stator winding is indicated at 15.

The described stator co-operates with an annular rotor of the squirrel-cage type, which comprises a stack of annular rotor laminations 17 having perforations through which are threaded a large number of small-diameter bars 18 of high-conductivity copper, the ends of which are joined by short-circuit rings 19.

It has been found that the use, according to a feature of the invention, of a great number of small-diameter rods of high-conductivity material instead of the more conventional use of a comparatively small number of rods of greater diameter made of a lightweight material, such as aluminium, which has a higher specific resistance than the copper which is employed according to the present invention, enables the total weight of the rotor to be reduced even though the total weight of copper required for a particular resistance value desired is greater than the total weight of aluminium conventionally used. This saving total weight is due to the fact that the decrease in diameter of the rods allows the radial depth of the laminations to be reduced.

The assembled rotor body is mounted on the circumference of a light-metal sleeve 20 which forms the outer wall of an axial-flow pump rotor 21. The illustrated rotor 21 comprises a separator blade 22 in the form of a single-start helix extending in a plurality of turns substantially over the whole length of the sleeve 20, the leading edge of the blade 22 being slightly proud of the liquid-entrance end of the sleeve. The use of a single-start helix extending over several turns constitutes a departure from the normal multi-start construction of helical separators; it has been adopted because it results in less reduction of the cross-section available for the flow, which is only reduced by the cross-section of a single helical blade, while its greater length resulting from the single-start construction does not add to the total length of the apparatus because it still does not exceed the length of the hollow rotor of the electric motor in which it is accommodated. The helical blade 22 is secured by brazing to a hub body 23 which is fitted on the shaft 24, which latter consists of a hardened bush. The bush forms journals at each end, which are supported in carbon bearings 25. One of these carbon bearings is mounted in the boss 4 of the end plate 3 of the main housing 1, while the other is arranged in a spider 26 which is clamped to the combined pump-and-stator housing by the same screws 7 which also serve for supporting the end ring 6. When the unit is submerged in a liquid with the end ring 6 lowermost, and the motor is energised, the resulting rotation of the helical blade 22 produces an upward flow of liquid in the bore of the sleeve 20 while at the same time, due to the impact angle of the leading edge of the blade relative to the incoming liquid, a zone of reduced pressure is formed at the trailing side of the helical blade. This pressure reduction causes on the one hand any separation of vapour and air that is liable to take place in the pump, to occur mainly at this low-pressure side of the blade, and at the same time it causes a portion of the intake to return along this trailing side of the blade 22 from the outlet end to the inlet end of the blade. As mentioned before, this inlet end of the blade is proud of the inlet end of the sleeve 22, so that the returning liquid, which contains substantially all the air and vapour that has become liberated during the passage, and which during its return flow has moved to the periphery of the sleeve 20, is free to return radially to the tank along the lower end face of the sleeve and then to rise to the surface of the tank. In order to prevent any of this returning vapour-rich liquid from being sucked back into the inlet of the sleeve 20, a deflector baffle 27, formed with an inlet nozzle 28 of slightly smaller inside diameter than the inlet end of the sleeve 20, is brazed to the upper side (in the drawing) of the spider 26.

In the illustrated embodiment the pump housing 1 additionally contains a radial impeller pump serving to increase the pressure of the liquid delivered by the vapour separator 21. For this purpose the sleeve 20 has an outwardly flared extension 28 at its upper or outlet end. This extension forms jointly with the hub 4, a deflector by which the axial direction of flow is converted into an outwardly directed radial flow, and the end face of the flared extension 28 carries a set of impeller blades 29 projecting into close proximity of the inner surface of the housing end plate 3, which are secured to it by brazing. The pump housing 5 is partly closed at its upper end by an inwardly projecting annular end wall 30, which is spaced from the end plate 3 of the main housing 1 by approximately the same distance as that separating that end plate from the end surface of the extension 28 of the sleeve 20, and a set of radial diffusor blades 31, projecting into close proximity of the annular end wall 30, are brazed to the inner face of the end wall 3 of the main housing 1.

The rotor body 17 is clamped against a shoulder 32 on the light-metal sleeve 20 by a collar 33 which fits over the other end of the sleeve 20. This collar 33 is secured on the light-metal sleeve 20 after assembly by a solder which will melt at a temperature not affecting the brazed connections between the separator blade 22 and the sleeve 20. The cylindrical outer surface of the collar 33 may be utilised to cooperate with the inner surface of the collar 8 of the annular end plate 6 to form a labyrinth seal.

Rotation of the rotor body 17 relative to the sleeve 20 is prevented by a pin 35 which is fixed in one of the short-circuit rings 19 of the rotor and projects into an axial slot 36 formed in the shoulder portion 32 of the light-metal sleeve 20.

To facilitate mounting of the motor-driven pump unit on the inner side of a tank bottom, the screws 7 are preferably provided at their headed ends with coaxial screw-tapped socket bores 37, which may be engaged by screws projecting through suitably arranged bores in the tank bottom.

Details of the described motor-driven pump unit may be modified within the scope of the present invention. Thus an axial pump unit other than a helical separator blade may, if desired, be arranged inside the hollow sleeve 20, and although the combination of the rotor with a radial pump as illustrated is believed to be particularly convenient, it is not essential to the invention in its broader aspects.

One of the advantages of the apparatus described is its simplicity of assembly, since when the brazing operation and insertion of the wound stator and rotor bodies has been completed, the whole unit comprises only three separate main parts, namely the combined pump-and-motor housing, the rotor, and the spider end member.

Another advantage, especially important when the unit is employed in supersonic aircraft, is that the housing 1 forms a jacket 1a which surrounds the motor and is always filled with fuel so as to act as a heat sink protecting the motor from becoming overheated when the fuel tank is nearly empty. A nonreturn valve, not shown, which is installed in the normal manner in the pump delivery line, serves to retain this fuel.

What I claim is:

1. A fuel pump for submerged installation in a fuel tank, comprising a volute-type pump housing formed with a lateral delivery connection, said housing being closed at one side of the volute and having a circular opening at the other side, a stator housing having a substantially cylindrical external surface fitting into said aperture and sealingly secured therein to project into proximity of said closed side of the pump housing and having a generally cylindrical inner surface concentric with said external surface, and an end wall projecting radially inwardly from said cylindrical inner surface to form with said closed side of the pump housing a generally radial diffusor channel, diffusor guide vanes in said diffusor channel extending axially between the opposed surfaces of said closed side of the pump housing and said end wall respectively, a stator body of ferromagnetic material fitted on said cylindrical inner surface of the stator housing in fixed relation to the stator housing, a stator winding accommodated in said stator body, a perforate end shield secured to the assembly of said pump housing and stator housing, the said end shield and the closed side of the pump housing having aligned bearing means coaxial with the cylindrical surfaces of the stator body, a rotor body mounted for rotation in said bearing means, said rotor body having a central portion coaxial with said bearings, an outer wall portion, radially spaced from the central portion to form with said central portion an annular passage coaxial with said central portion, said outer portion having a substantially cylindrical outer surface and being connected to said central body by a substantially helical fin portion and having at its end adjacent to the closed side of the pump housing an outwardly extending flange to form with said closed side passage chamber extending substantially radially of the housing, said flange portion having impeller blades extending into said chamber axially of the central portion into close proximity of the closed end of the pump housing, said radial chamber of the rotor being substantially aligned with said radial passage of the stator, an annular rotor body of ferromagnetic material secured on the cylindrical outer surface of said outer wall portion to face the cylindrical inner surface of the stator body, said ferromagnetic rotor body being equipped with a short-circuit winding of the squirrel-cage type, the arrangement being such as to permit the entry of liquid delivered from said chamber in the rotor to enter between the adjacent walls of the stator and rotor body so as to immerse the said bodies.

2. A fuel pump as claimed in claim 1, wherein the short-circuit winding of the rotor is constituted by a large number of small-diameter bars of high conductivity copper so that the squirrel cage is confined within a small fraction of the radius of the rotor.

References Cited by the Examiner

UNITED STATES PATENTS

| 1,711,045 | 4/1929 | Davis | 103—87 |
| 2,419,146 | 4/1947 | Kimm et al. | 103—113 X |
| 2,524,269 | 10/1950 | Patterson | 103—87 |

FOREIGN PATENTS

| 1,134,967 | 12/1956 | France. | |

ROBERT M. WALKER, *Primary Examiner.*